(12) United States Patent
Liu et al.

(10) Patent No.: US 8,666,456 B2
(45) Date of Patent: Mar. 4, 2014

(54) HANDHELD ELECTRONIC APPARATUS

(75) Inventors: Cheng-Hsi Liu, Taoyuan County (TW);
Pi-Lin Lo, Taoyuan County (TW);
Jih-Jonq Shiue, Taoyuan County (TW);
Chung-Ju Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 8 days.

(21) Appl. No.: 13/585,840

(22) Filed: Aug. 15, 2012

(65) Prior Publication Data
US 2013/0095885 A1  Apr. 18, 2013

Related U.S. Application Data

(60) Provisional application No. 61/546,068, filed on Oct. 12, 2011.

(51) Int. Cl.
*H04M 1/00* (2006.01)
*G06F 3/041* (2006.01)
*H04M 1/725* (2006.01)

(52) U.S. Cl.
CPC .................... *H04M 1/72519* (2013.01)
USPC ........ 455/566; 455/550.1; 455/90.3; 345/173; 345/175; 345/176

(58) Field of Classification Search
USPC .............. 455/566, 550.1, 90.3; 345/173, 175, 345/176; 362/23.06
See application file for complete search history.

(56) References Cited

U.S. PATENT DOCUMENTS

| | | | |
|---|---|---|---|
| 7,794,130 B2* | 9/2010 | Chung et al. ................... | 362/612 |
| 8,095,180 B2* | 1/2012 | Lee et al. .................... | 455/556.1 |
| 8,154,521 B2* | 4/2012 | Lim et al. ...................... | 345/170 |
| 8,224,391 B2* | 7/2012 | Kim et al. ..................... | 455/566 |
| 8,395,588 B2* | 3/2013 | Yamashita et al. ............ | 345/173 |
| 8,471,810 B2* | 6/2013 | Kim et al. ..................... | 345/156 |
| 2010/0232098 A1* | 9/2010 | Chung et al. ............. | 361/679.01 |
| 2011/0014955 A1* | 1/2011 | Kim et al. ..................... | 455/566 |
| 2011/0299134 A1* | 12/2011 | Shimoyama et al. ......... | 358/474 |
| 2012/0086673 A1* | 4/2012 | Chien et al. ................... | 345/175 |

* cited by examiner

*Primary Examiner* — Duc M Nguyen
(74) *Attorney, Agent, or Firm* — Jianq Chyun IP Office

(57) ABSTRACT

A handheld electronic apparatus including a casing, a cover, a motherboard, an in-cell touch display module, a light guide member, and a touch module is provided. The cover covers a casing opening, and constitutes an accommodation space with the casing. The cover has a first area and a second area having a light transmissive icon. The motherboard is electrically connected with the in-cell touch display module and the touch module. The in-cell touch display module has a display area disposed beneath the first area. The light guide member is disposed within the accommodation space, and capable of guiding a light generated from a light emitting element to the light transmissive icon. The light guide member has a sheet-shaped portion disposed beneath the second area by corresponding to the light transmissive icon. The touch module is disposed within the accommodation space and beneath the second area.

8 Claims, 9 Drawing Sheets

HANDHELD ELECTRONIC APPARATUS

CROSS-REFERENCE TO RELATED APPLICATION

This application claims the priority benefit of U.S. provisional application Ser. No. 61/546,068, filed on Oct. 12, 2011. The entirety of the above-mentioned patent application is hereby incorporated by reference herein and made a part of this specification.

BACKGROUND

1. Field of the Invention

The application relates to a handheld electronic apparatus, and more particularly to, a handheld electronic apparatus having touch keys.

2. Description of Related Art

In the modern information society, human dependence on the consumer type handheld electronic apparatuses has increased gradually. All kinds of mobile phone, Smart Phone or Tablet PC may be seen in everywhere around the daily life, and thus the consumer type electronic apparatuses are inseparable from the daily life in the modern society. In order to achieve objectives of being more convenient, lighter volume and more humane, many products have transformed from using a conventional input device, such as traditional keyboard or mouse, to an input device having a touch panel.

In conventional technology, a handheld electronic apparatus with touch function often disposes a touch panel over a display module and disposes icons on the touch panel to be used as touch keys; and when the user touches the icons, the touch panel is driven to generate signals.

SUMMARY OF THE INVENTION

The application provides a handheld electronic apparatus, having a touch module independent from an in-cell touch display module, providing a touch function outside of a display area.

The application provides a handheld electronic apparatus including a casing, a cover, a motherboard, an in-cell touch display module, a light guide member and a touch module. The casing has a casing opening. The cover is disposed on the casing and covers the casing opening, so as to constitute an accommodation space with the casing. The cover has a first area and a second area, and the second area has light transmissive icon. The motherboard is disposed within the accommodation space and has a light emitting element. The in-cell touch display module is disposed within the accommodation space, and is electrically connected to the motherboard. The in-cell touch display module has a display area, and the display area is disposed beneath the first area of the cover. The light guide member is disposed within the accommodation space, and is capable of guiding a light generated from the light emitting element to the light transmissive icon. The light guide member has a sheet-shaped portion, and the sheet-shaped portion is disposed beneath the second area of the cover by corresponding to the light transmissive icon. The touch module is disposed within the accommodation space and beneath the second area of the cover, and is electrically connected to the motherboard.

According to the foregoing, in the handheld electronic apparatus of the application, the touch module is disposed within the accommodation space constituted of the casing and the cover, and the cover has the light transmissive icon. When a user approaches or touches the light transmissive icon by the capacitive stylus or a finger, the touch module may be driven to generate a touch signal. In addition, the light guide member is disposed beneath the light transmissive icon of the cover, and the light generated from the light emitting element disposed on the motherboard may be guided to the light transmissive icon via the light guide member, and enable the light transmissive icon to be easily identified. The light transmissive icon may be driven by the independently configured touch module, and is suitable to be applied in the handheld electronic apparatus having the in-cell touch display module.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
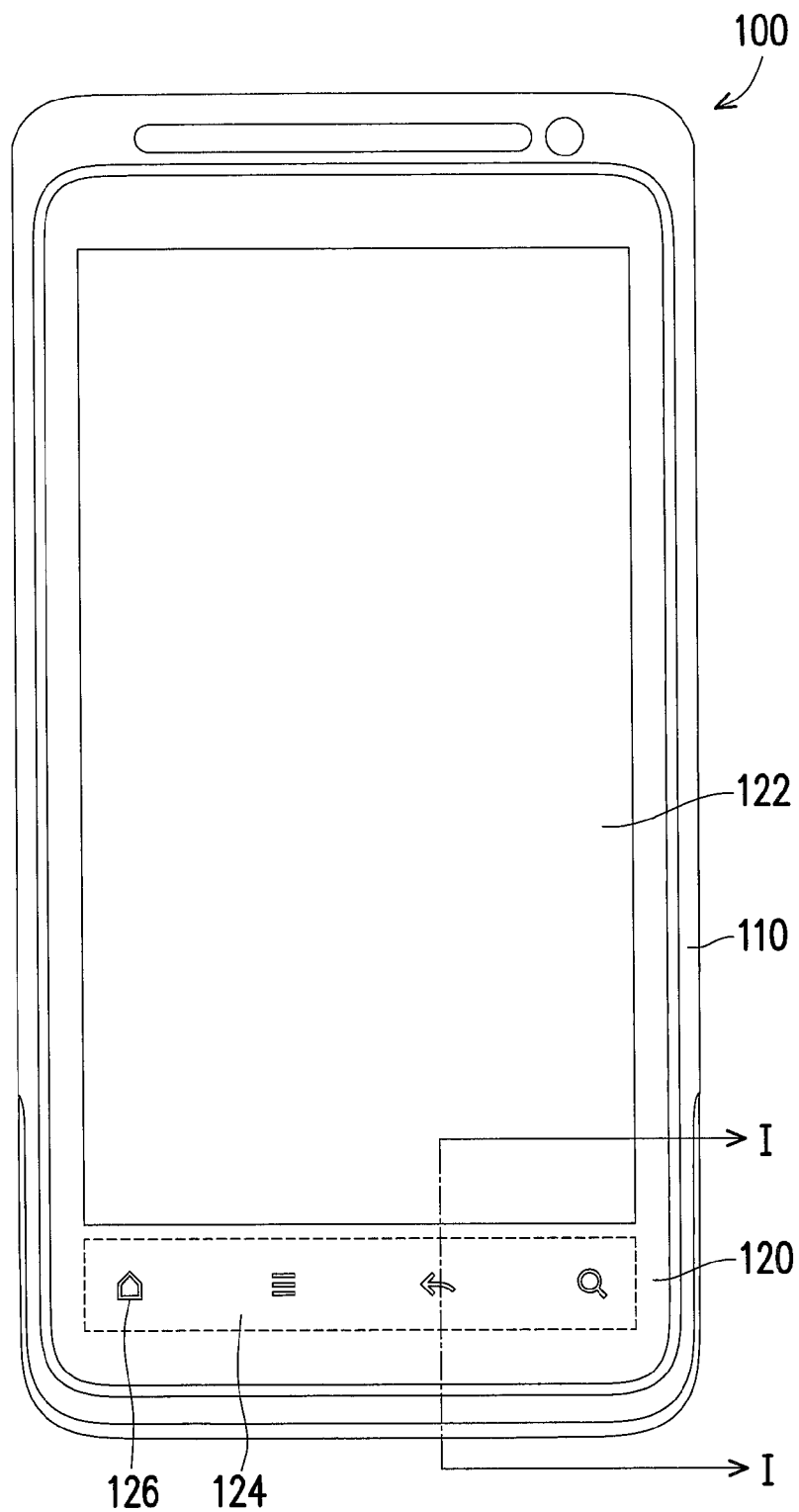
FIG. 1A and FIG. 1B are a front view and an exploded view of a handheld electronic apparatus according to an embodiment of the invention.
Figure 1B:
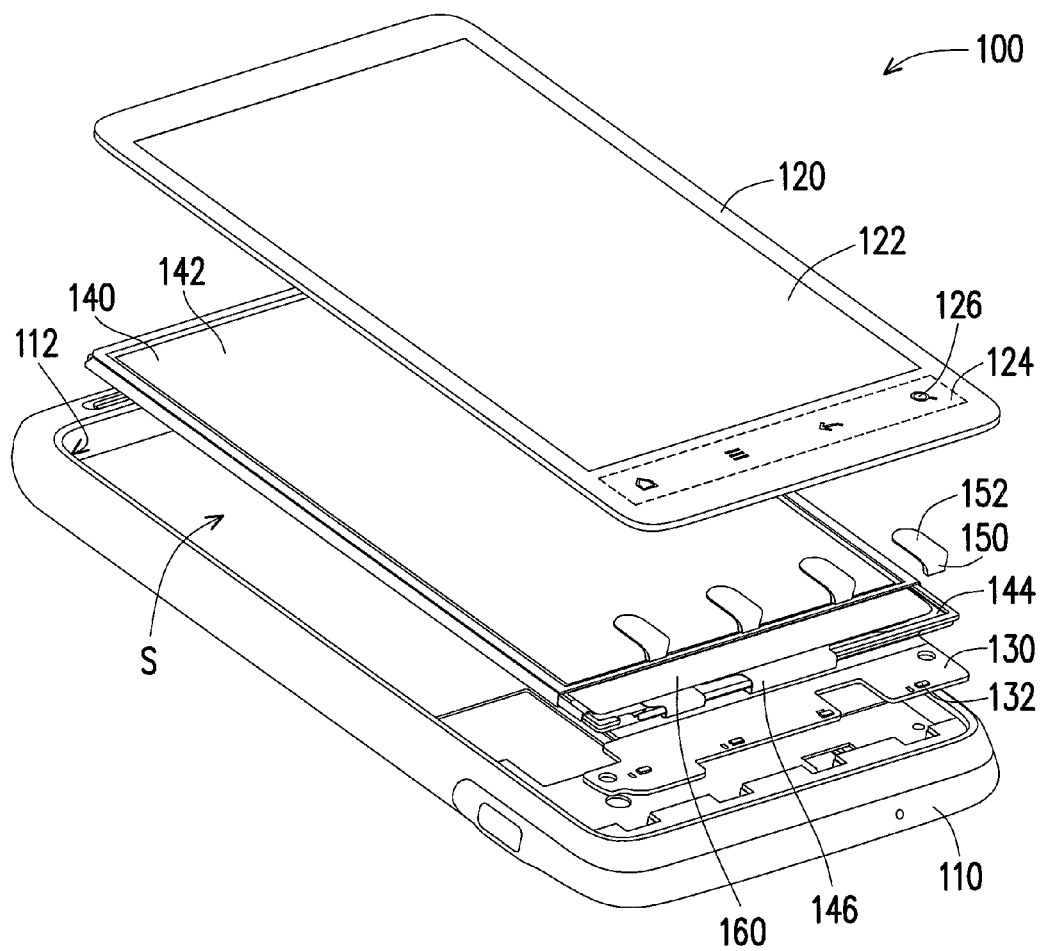
Figure 2A:
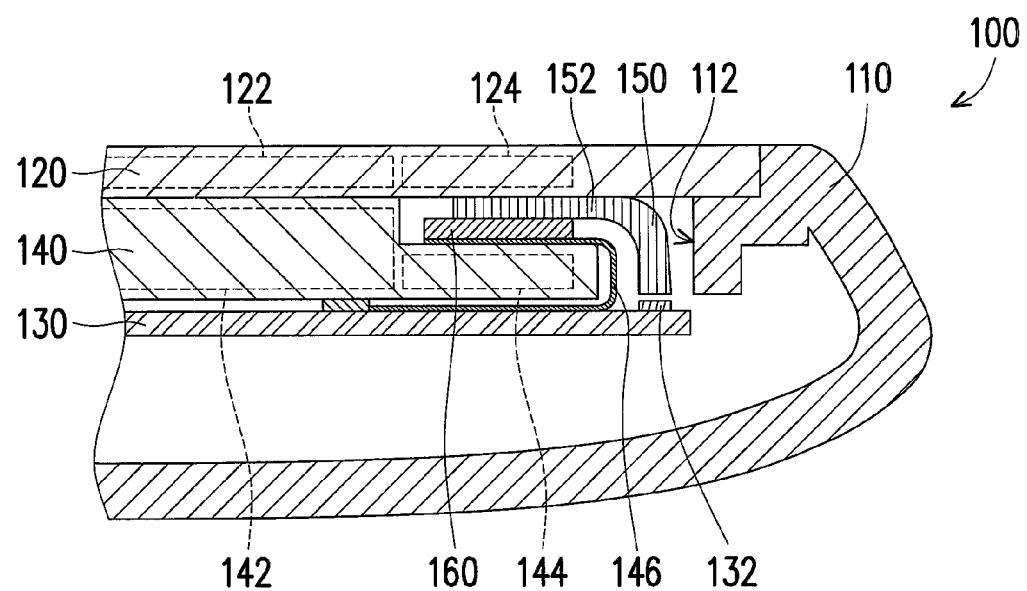
FIG. 2A is a cross-sectional view of the handheld electronic apparatus along a line I-I in FIG. 1A.

FIG. 1A is a front view illustrating a handheld electronic apparatus according to an embodiment of the invention. FIG. 1B is an exploded view illustrating the handheld electronic apparatus in FIG. 1A. FIG. 2A is a cross-sectional view illustrating the handheld electronic apparatus along a profile line I-I in FIG. 1A. Referring to FIG. 1A, FIG. 1B and FIG. 2A, the handheld electronic apparatus 100 includes a casing 110, a cover 120, a motherboard 130, an in-cell touch display module 140, a light guide member 150, and a touch module 160. The casing 110 has a casing opening 112. The cover 120 is disposed on the casing 110 and covers the casing opening 112, so as to constitute an accommodation space S with the casing 110. The cover 120 has a first area 122 and a second area 124, and the second area 124 has a light transmissive icon 126. The motherboard 130 is disposed within the accommodation space S and has a light emitting element 132.

The in-cell touch display module 140 is disposed within the accommodation space S, and is electrically connected to the motherboard 130. The in-cell touch display module 140 has a display area 142, and the display area 142 is disposed beneath the first area 122. In the present embodiment, the in-cell touch display module 140 may be an integration of a touch circuit and a liquid crystal display module, an integration of a touch circuit and an organic light emitting display module, or an integration of a touch circuit and other type of display module. The light guide member 150 is disposed within the accommodation space S, and is capable of guiding a light generated from the light emitting element 132 to the light transmissive icon 126. The light guide member 150 has a sheet-shaped portion 152, and the sheet-shaped portion 152 is disposed beneath the second area 124 of the cover 120 by corresponding to the light transmissive icon 126. The touch module 160 is disposed within the accommodation space S and beneath the second area 124 of the cover 120, and is electrically connected to the motherboard 130. In the present embodiment, a material of the cover 120 may be glass or plastic.

Figure 2B:
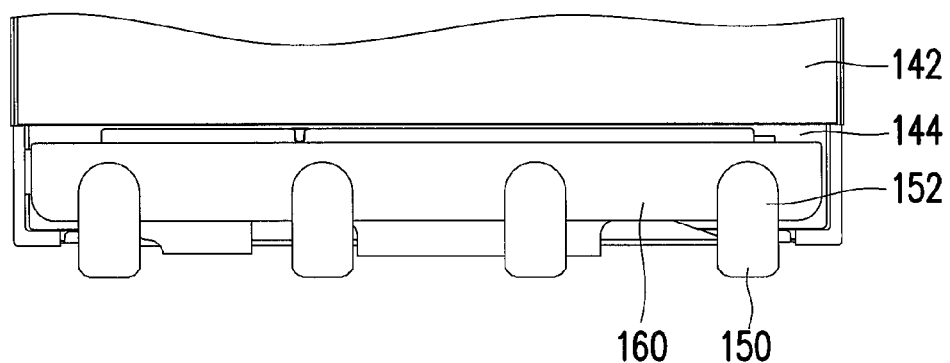
FIG. 2B is a partial enlarged view of the handheld electronic apparatus in FIG. 1A after a cover is removed.

FIG. 2B is a partial enlarged view illustrating the handheld electronic apparatus in FIG. 1A after the cover is removed. Referring to FIG. 2A and FIG. 2B, in the present embodiment, the handheld electronic apparatus 100 has at least one light transmissive icon 126 (as shown in FIG. 1A, four are illustrated in the drawing), and the sheet-shaped portions 152 of the light guide member 150 are correspondingly disposed beneath each light transmissive icons 126. The sheet-shaped portions 152 are capable of guiding the light emitted from the light emitting element 132 and enable the light transmissive icons 126 to be easily identified. When a user uses a capacitive touch pen or a finger to be near to or in contact with one of the light transmissive icons 126, the touch module 160 is then driven to generate a touch signal, so that the light transmissive icons 126 may possess functionalities similar to a command input of physical keys. These touch keys may be attained with an independently configured touch module, no additional touch circuit is required to be disposed on the cover 120, and no enlargement of an area of the in-cell touch display module 140 is required, thus more suitable for being applied in the handheld electronic apparatus 100 having the in-cell touch display module 140.

Referring to FIG. 1B and FIG. 2A, in the present embodiment, the in-cell touch display module 140 has a non-display area 144 adjacent to the display area 142, and the sheet-shaped portions 152 are located between the second area 124 of the cover 120 and the non-display area 144 of the in-cell touch display module 140. In other embodiments, the in-cell touch display module 140 does not have the non-display area 144, and the sheet-shaped portions 152 and the touch module 160 are disposed beneath the second area 124 of the cover 120.

Within the accommodation space S, the touch module 160 is disposed beneath the sheet-shaped portions 152 of the light guide members 150, and when the user uses the capacitive touch pen or the finger to be near to or in contact with one of the light transmissive icons 126, the touch module 160 can be driven. In addition, the in-cell touch display module 140 further has a flexible printed circuit board (FPC) 146 electrically connected to the motherboard 130, and the touch module 160 may also be electrically connected to the motherboard 130 through the flexible printed circuit board 146. Nevertheless, the application does not limit the light guide member and the touch module to the stacking arrangement mentioned above, other stacking arrangements are described in several embodiments below.

Figure 3A:
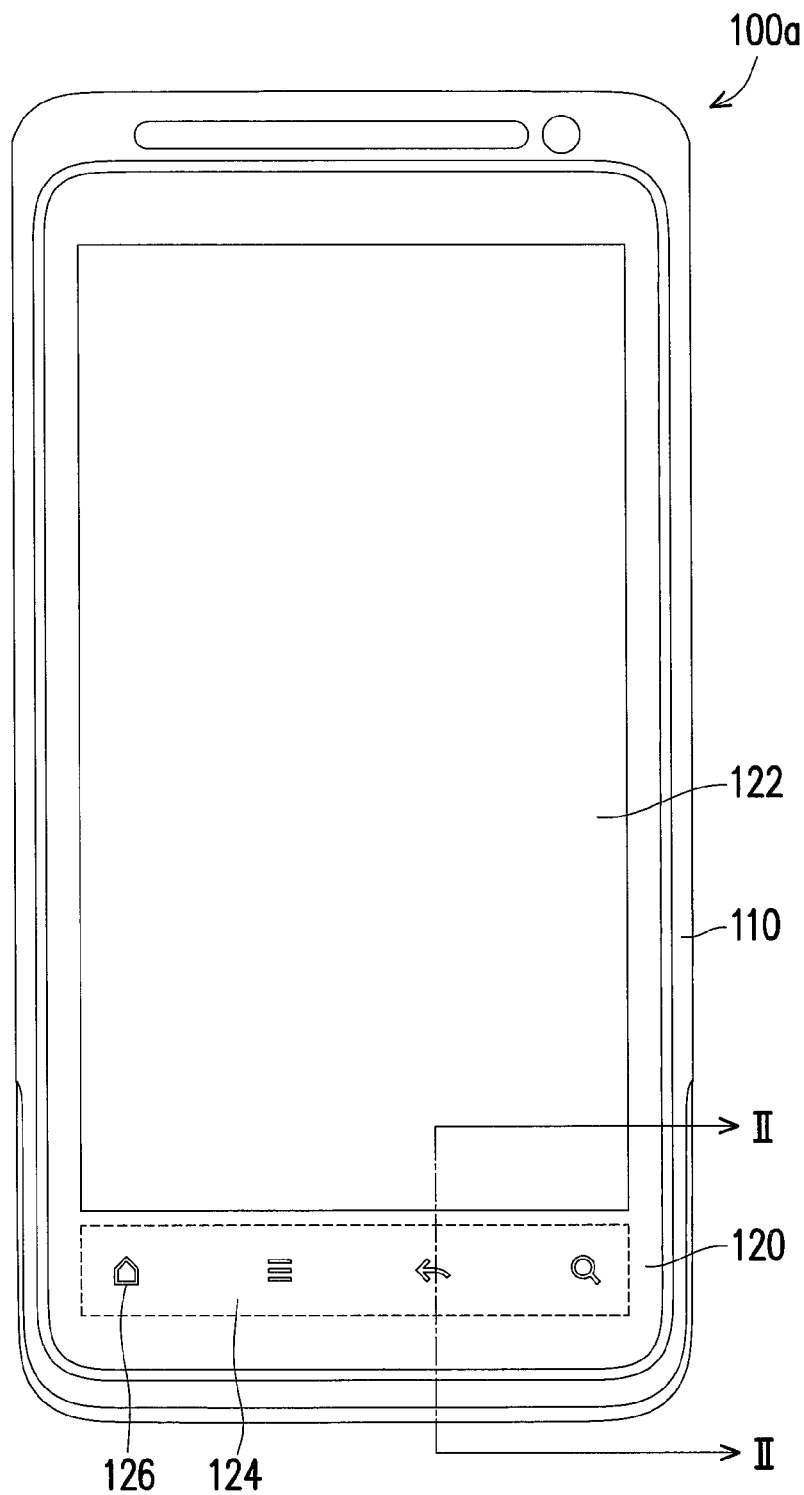
FIG. 3A and FIG. 3B are a front view and an exploded view of a handheld electronic apparatus according to another embodiment of the invention.
Figure 3B:
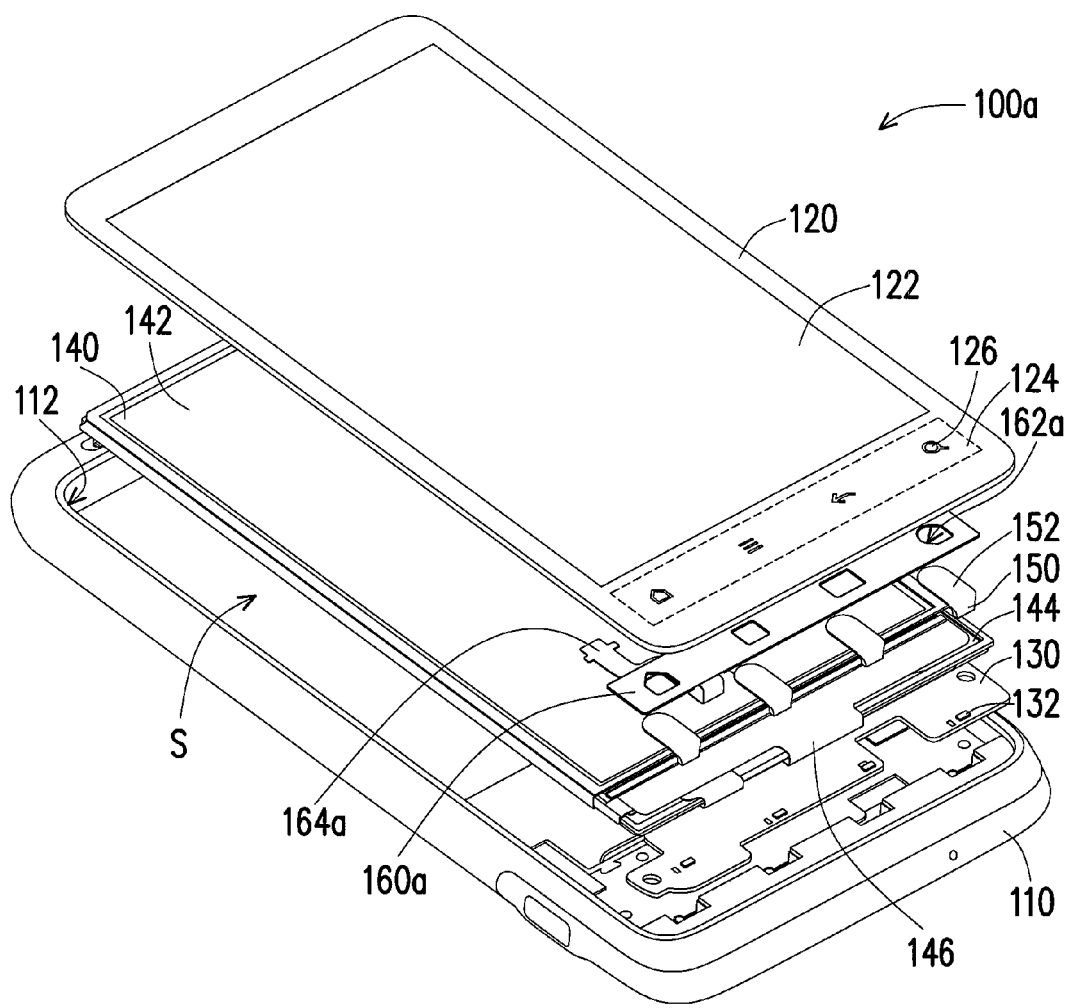
Figure 4A:
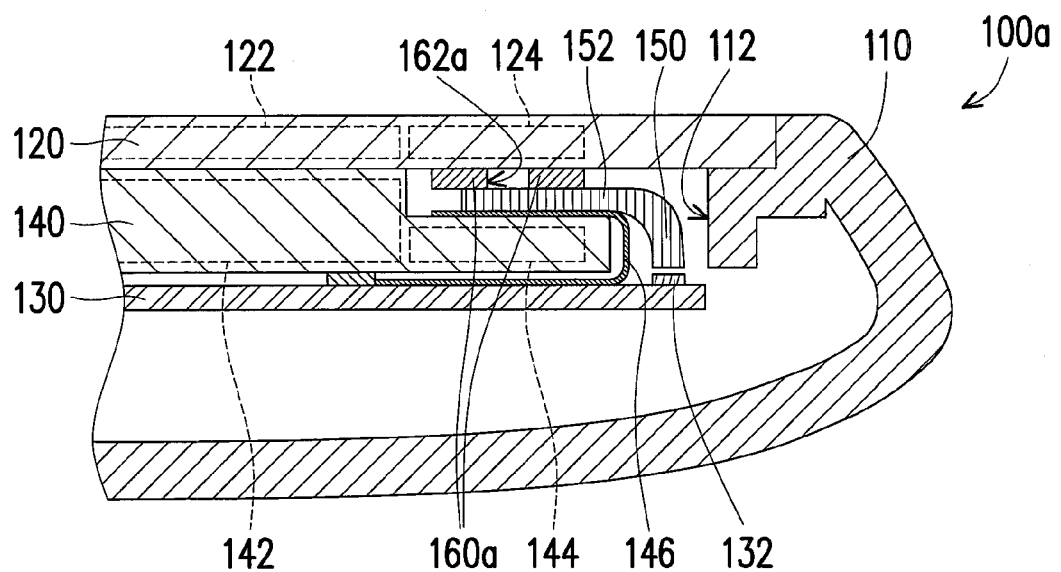
FIG. 4A is a cross-sectional view of the handheld electronic apparatus along a line II-II in FIG. 3A.

FIG. 3A is a front view illustrating a handheld electronic apparatus according to another embodiment of the invention. FIG. 3B is an exploded view illustrating the handheld electronic apparatus in FIG. 3A. FIG. 4A is a cross-sectional view illustrating the handheld electronic apparatus along a profile line II-II in FIG. 3A. Referring to FIG. 3A, FIG. 3B and FIG. 4A, the handheld electronic apparatus 100a includes a casing 110, a cover 120, a motherboard 130, an in-cell touch display module 140, a light guide member 150, and a touch module 160a. Nevertheless, a difference between the handheld electronic apparatus 100a and the handheld electronic apparatus 100 in FIG. 1A is that, the touch module 160a of the handheld electronic apparatus 100a has at least one module opening 162a (four are illustrated in the drawing). These module openings 162a are respectively corresponding to a profile of one of the light transmissive icons 126, sheet-shaped portions 152 of the light guide member 150 are disposed beneath the touch module 160a, and the light guide member 150 guides a light generated from the light emitting element 132 to the one of the light transmissive icons 126.

Figure 4B:
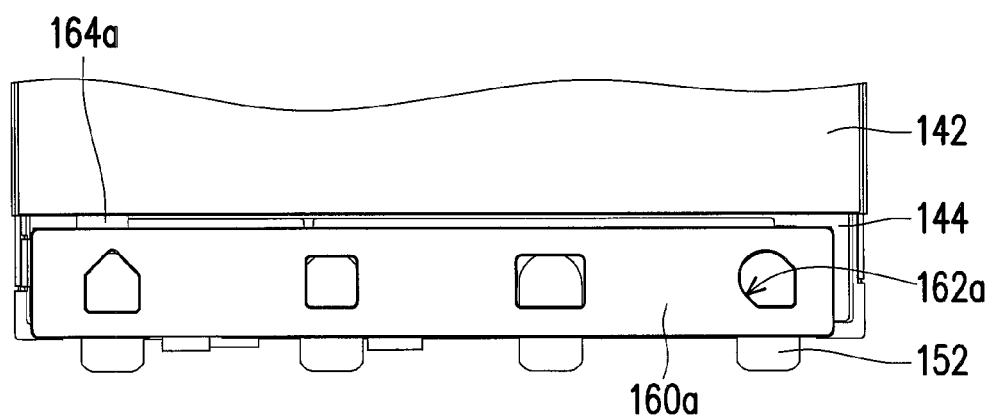
FIG. 4B is a partial enlarged view of the handheld electronic apparatus in FIG. 3A after a cover is removed.

FIG. 4B is a partial enlarged view illustrating the handheld electronic apparatus in FIG. 3A after the cover is removed. When a user uses a capacitive touch pen or a finger to be near to or in contact with one of the light transmissive icons 126 shown in FIG. 3B, the touch module 160a is driven to generate a signal, and the module openings 162a are respectively disposed at a location of each light transmissive icon 126 corresponding to the touch module 160a. From the perspective of FIG. 4B, each module opening 162a has an overlapped region with one of the sheet-shaped portions 152 of the light guide member 150. Therefore, the light from the light emitting element 132 may still be guided through the sheet-shaped portion 152 and then through the module opening 162a to the light transmissive icon 126. In addition, in the present embodiment, the touch module 160a further has a flexible printed circuit board 164a (as shown in FIG. 3B) electrically connected to the motherboard 130, and the signal generated by the touch module 160a is transmitted to the motherboard 130 from the flexible printed circuit board 164a.

Figure 5A:
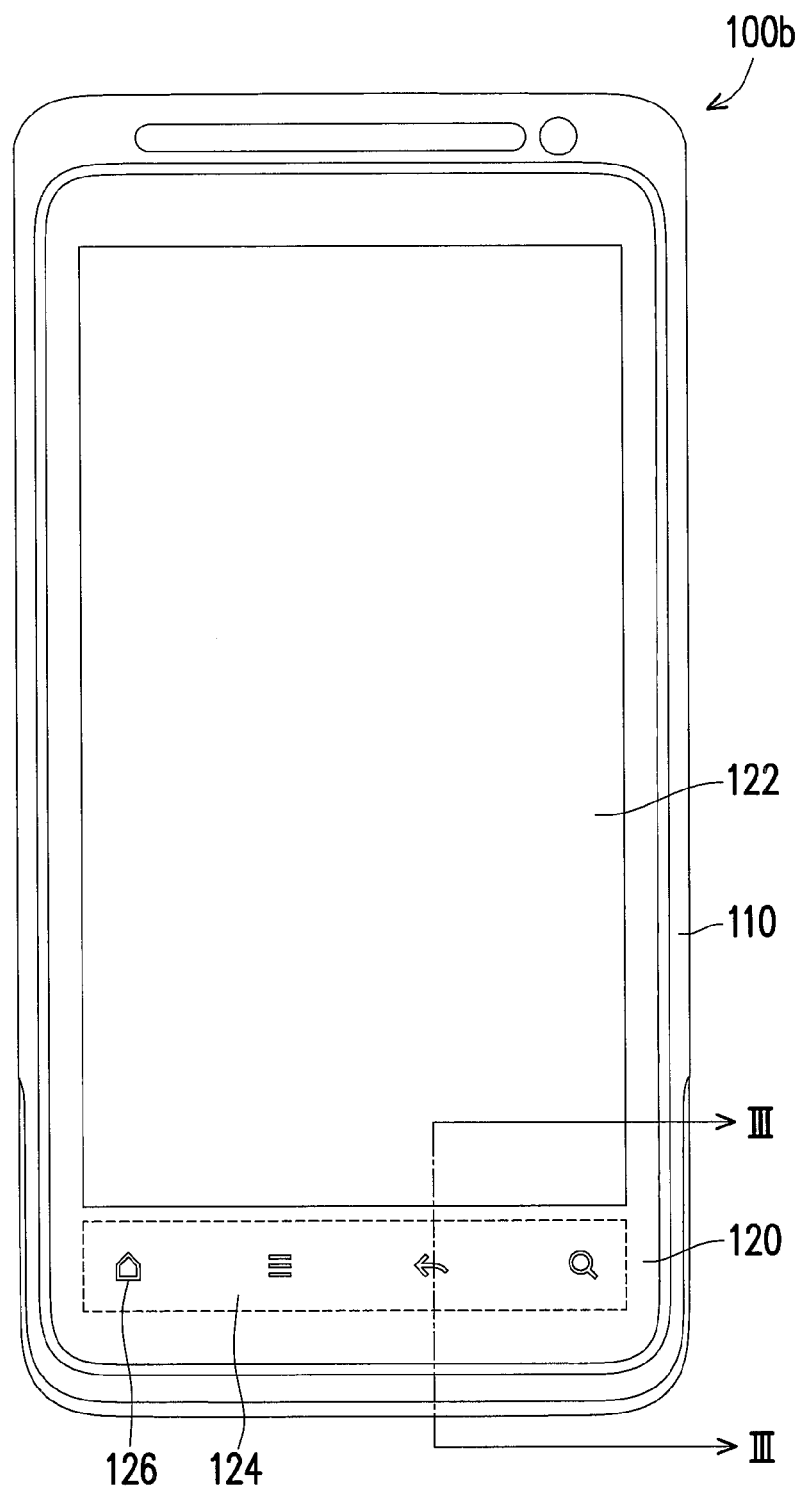
FIG. 5A and FIG. 5B are a front view and an exploded view of a handheld electronic apparatus in according to still another embodiment of the invention.
Figure 5B:
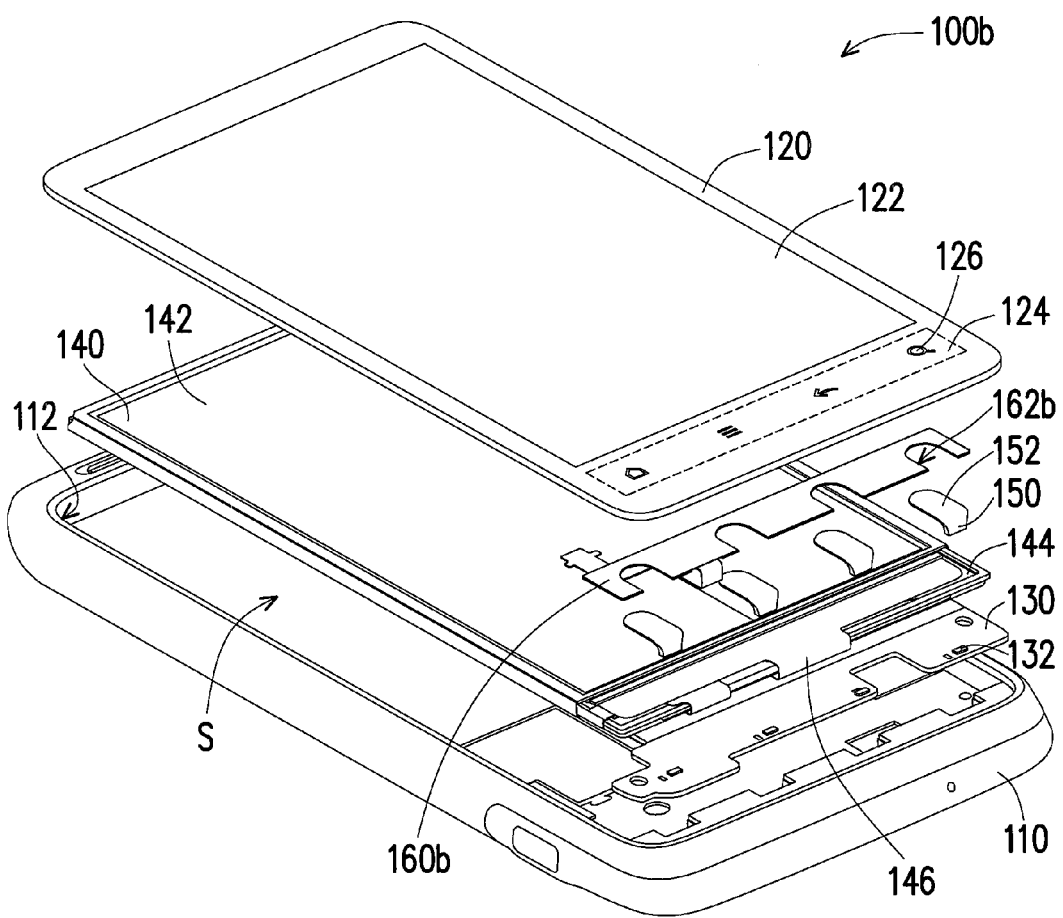
Figure 6A:
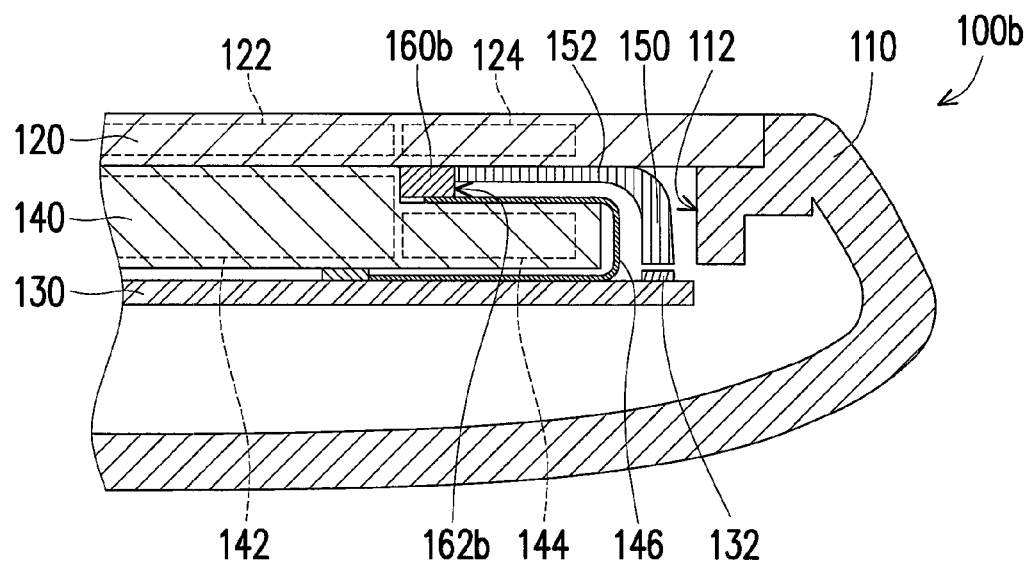
FIG. 6A is a cross-sectional view of the handheld electronic apparatus along a line III-III in FIG. 5A.

FIG. 5A is a front view illustrating a handheld electronic apparatus in according to still another embodiment of the invention. FIG. 5B is an exploded view illustrating the handheld electronic apparatus in FIG. 5A. FIG. 6A is a cross-sectional view illustrating the handheld electronic apparatus along a profile line III-III in FIG. 5A. Referring to FIG. 5A, FIG. 5B and FIG. 6A, the handheld electronic apparatus 100b includes a casing 110, a cover 120, a motherboard 130, an in-cell touch display module 140, a light guide member 150, and a touch module 160b. Nevertheless, a difference between the handheld electronic apparatus 100b and the handheld electronic apparatus 100a in FIG. 3A is that, the touch module 160b of the handheld electronic apparatus 100b has at least one breach 162b (four are illustrated in the drawing). These breaches 162b are respectively corresponding to a profile of one of the sheet-shaped portions 152 of the light guide member 150, and each sheet-shaped portion 152 of the light guide member 150 is disposed within one of the breaches 162b for guiding a light generated from the light emitting element 132 to the corresponding light transmissive icon 126.

Figure 6B:
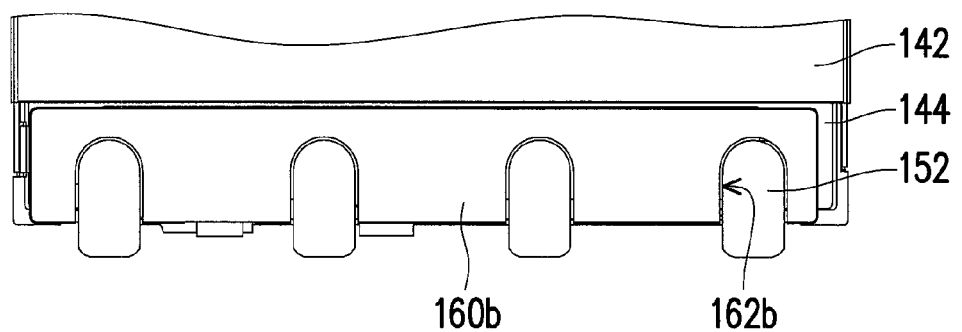
FIG. 6B is a partial enlarged view of the handheld electronic apparatus in FIG. 5A after a cover is removed.

FIG. 6B is a partial enlarged view illustrating the handheld electronic apparatus in FIG. 5A after the cover is removed. When a user uses a capacitive touch pen or a finger to be near to or in contact with one of the light transmissive icons 126 shown in FIG. 5B, the touch module 160b may still be driven to generate a signal. In addition, since the breaches of the touch module 160b are corresponding to the profiles of the sheet-shaped portions 152, the sheet-shaped portions 152 and contours of the breaches 162b of the touch module 160b are in compliance with each other. The light generated from the light emitting element 132 may directly reach the light transmissive icons 126 through the sheet-shaped portions 152. In addition, relative locations of the sheet-shaped portions 152 and the touch module 160b are not limited to the embodiment shown in FIG. 6A.

In summary, the touch module of the handheld electronic apparatus of the current application is disposed within the accommodation space constituted of the casing and the cover, and the cover has at least one of the light transmissive icon thereon. The light guide member is disposed beneath the light transmissive icon, and the light guide member may guide the light emitted from the light emitting element on the motherboard to the bottom of the light transmissive icon, and enable the light transmissive icon to be easily identified. When the user uses the capacitive touch pen or the finger to be near to or in contact with the light transmissive icon, the touch module is driven to generate the touch signal, and the light transmissive icon may function like a physical key with command input functionality. The light transmissive icon of the handheld electronic apparatus in the application can be driven by the touch module independently configured from the in-cell touch display module for acting as a touch key, and thus is more suitable to be applied in the handheld electronic apparatus having the in-cell touch display module. In addition, the touch module may further be co-constructed with the flexible printed circuit board of the in-cell touch display module, or be in compliance with the contour of the light guide member, so as to lowering a thickness of the handheld electronic apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic apparatus comprising:
   a casing having a casing opening;
   a cover disposed on the casing and covering the casing opening, so as to constitute an accommodation space with the casing, the cover having a first area and a second area, and the second area having at least one light transmissive icon;
   a motherboard disposed within the accommodation space, the motherboard having at least one light emitting element;
   an in-cell touch display module disposed within the accommodation space and electrically connected to the motherboard, the in-cell touch display module having a display area, and the display area disposed beneath the first area of the cover;
   at least one light guide member disposed within the accommodation space, and capable of guiding a light generated from the light emitting element to the light transmissive icon, the light guide member having a sheet-shaped portion, and the sheet-shaped portion disposed beneath the second area of the cover by corresponding to the light transmissive icon; and
   a touch module disposed within the accommodation space and beneath the second area of the cover, and electrically connected to the motherboard.

2. The handheld electronic apparatus as recited in claim 1, wherein the touch module is disposed beneath the sheet-shaped portion of the light guide member.

3. The handheld electronic apparatus as recited in claim 2, wherein the in-cell touch display module has a flexible printed circuit board electrically connected to the motherboard, and the touch module is co-constructed on the flexible printed circuit board.

4. The handheld electronic apparatus as recited in claim 1, wherein the touch module has at least one module opening, the module opening is corresponded to a profile of the light transmissive icon, the sheet-shaped portion of the light guide member is disposed beneath the touch module, and the light guide member guides the light generated form the light emitting element to the light transmissive icon.

5. The handheld electronic apparatus as recited in claim 1, wherein the touch module has at least one breach, the breach is corresponded to a profile of the sheet-shaped portion of the light guide member, the sheet-shaped portion of the light guide member is disposed within the breach, and the light guide member guides the light generated from the light emitting element to the light transmissive icon.

6. The handheld electronic apparatus as recited in claim 1, wherein the touch module has a flexible printed circuit board electrically connected to the motherboard, and a signal generated by the touch module is transmitted to the motherboard via the flexible printed circuit board.

7. The handheld electronic apparatus as recited in claim 1, wherein the in-cell touch display module has a non-display area adjacent to the display area, and the sheet-shaped portion is located between the second area of the cover and the non-display area of the in-cell touch display module.

8. The handheld electronic apparatus as recited in claim 1, wherein a material of the cover comprises glass.

* * * * *